(12) United States Patent
Bossut et al.

(10) Patent No.: US 7,130,471 B2
(45) Date of Patent: *Oct. 31, 2006

(54) DETERMINING OPTIMAL IMAGE COMPRESSION METHODS FOR REDUCING FILE SIZE

(75) Inventors: Philippe Bossut, Portola Valley, CA (US); John Bowler, Kerry, OR (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/210,228

(22) Filed: Aug. 22, 2005

(65) Prior Publication Data

US 2005/0280841 A1 Dec. 22, 2005

Related U.S. Application Data

(63) Continuation of application No. 09/681,719, filed on May 24, 2001, now Pat. No. 6,944,357.

(51) Int. Cl.
*G06K 9/36* (2006.01)
(52) U.S. Cl. .................. 382/232; 382/166; 382/240; 382/244
(58) Field of Classification Search ................ 382/232, 382/239, 240, 298, 299, 237, 244, 166; 369/124.06; 250/208.1; 348/97; 358/3.07, 3.27, 474, 358/1.15; 707/104.1
See application file for complete search history.

(56) References Cited

U.S. PATENT DOCUMENTS 6,453,073 B1 * 9/2002 Johnson ................... 382/239

FOREIGN PATENT DOCUMENTS

JP 411032296 A * 2/1999

* cited by examiner

*Primary Examiner*—Anh Hong Do
(74) *Attorney, Agent, or Firm*—Lyon & Harr, LLP; Mark A. Watson

(57) ABSTRACT

The present invention operates as an expert system to automatically determine an optimal method for reducing the size of an electronic file containing at least one embedded image by determining optimal methods for compressing each image. Further, in one embodiment, linked images are also compressed. User control of relevant parameters such as image compression options, retention or removal of unnecessary data associated with embedded or linked images, and downsampling images to better match the output resolution of specific output devices is provided in further embodiments. Further, to prevent cumulative degradation of images through repeated lossy compression, images that have already been compressed or optimized are preferably flagged so that they are not compressed more than once.

20 Claims, 4 Drawing Sheets

DETERMINING OPTIMAL IMAGE COMPRESSION METHODS FOR REDUCING FILE SIZE

CROSS REFERENCE TO RELATED APPLICATIONS:

This application is a Continuation Application of U.S. patent application Ser. No. 09/681,719, filed on May 24, 2001 now U.S. Pat. No. 6,944,357, by Bossut et al., and entitled "A SYSTEM AND PROCESS FOR AUTOMATICALLY DETERMINING OPTIMAL IMAGE COMPRESSION METHODS FOR REDUCING FILE SIZE," and claims priority to U.S. patent application Ser. No. 09/681,719 under Title 35, United States Code, Section 120.

BACKGROUND

1. Technical Field

The invention is related to a system and process for automatically determining optimal image compression methods for reducing file size, and more particularly, to a system and process for automatically determining optimal compression methods on an image by image basis for images in an electronic file.

2. Related Art

By way of background, one current scheme for controlling the size of images in a conventional word processing application is to either manually reduce image file size before inserting the image into a word processing file, or to launch an image editing application when an image in the word processing file is manually selected. This image editing application is used to manually control the size of the image in the word processing file. Further, it is often necessary to create and maintain several versions of the same image for different usage. For example, a word processing file that will only be rendered to a screen can have images with lower resolution than a word processing file that will be printed to a high-resolution printer. Consequently, because of the potentially significant variation in file size for these two uses, it may be necessary to maintain two separate versions of the electronic document to support these uses.

Further, with many conventional applications, images may be inserted into electronic files associated with the applications using any of a number of techniques. Many of these techniques often create unacceptably large image files, or create image files containing unacceptably large amounts of data, or even image files that contain unnecessary data. For example, some applications allow an image to be inserted directly into an electronic file via a scanner or electronic camera. Typically, the user scans a picture into the electronic document and uses a "crop tool" or similar feature to reduce the image size or zoom into a specific portion of the image. However, cropping the image in this manner typically doesn't translate in any reduction in the final document size because the cropped portion of the image is still maintained by the host application to allow a user to undo or modify the cropping of the associated image.

Another example of inserting an image into an electronic file or electronic document from within a host application, involves allowing a user to copy and paste a screen image into the electronic document. However, if the system color setting of the computer display is "True Color", the copy and paste of a simple screen image is done using 24 bits per pixels, even if an 8 bit palettized copy of the image would provide an indistinguishable image. Most modern computers display high-bit color schemes (16, 24 or even 32-bit color schemes) due to the power of conventional graphics accelerators and the capabilities of computer display monitors. Unfortunately, a 24-bit image is approximately three times larger than an 8-bit image. Thus, such copy and paste or cut and paste screen images tend to be substantially larger than necessary.

A further example of inserting an image into an electronic document involves the use of an inappropriate scanned image resolution. Modern scanners provide extremely high-resolution capabilities, with some scanners exceeding a 1200 dpi optical resolution. Often, users are unfamiliar with the effect of image resolution on image size, and when scanning an image will simply choose a "best" option, or the like, in an attempt to make the image look as good as possible. However, the document size grows dramatically when increasing image resolution since image size increases with the square of the resolution. For example, an image scanned at 300 dpi is approximately four times larger than an image scanned at 150 dpi, while an image scanned at 1200 dpi is approximately sixty-four times larger than the 150 dpi image. While the user may not even be aware of the size of the scanned image file, the size of that image often makes it impossible to email the file or even store the file on a floppy disk or other computer readable storage medium.

Still other methods of inserting images into an electronic document include cutting and pasting or copying and pasting an image from one application into a host application being used to create or edit the electronic document into which the image is being inserted. Unfortunately, in conventional operating systems, OLE data streams are often associated with images that are either cut or copied in one application, and then pasted into another application. OLE data streams, in some cases, actually contain more data than the image would contain by itself. For example, where the user manually compresses the inserted image, such as for example by converting an inserted bitmap (BMP) image to a JPEG image, an OLE data stream associated with the image may actually include the uncompressed BMP version of the image data, along with other data relating to the application used to create or edit the image. Typically, the user is not aware of such problems, and in fact, is rarely aware that an OLE data stream may be associated with an image, or that an OLE data stream even exists.

Further, users are typically unaware of the optimum compression method or file format for images, or even how or why an image should be converted from one format to another. Consequently, users often insert images in an inappropriate native image file format. Further, some images such as photographs should be compressed using specific encoding schemes such as a JPEG encoding scheme, while other non-photographic images are better compressed by simply palettizing the image. Unfortunately, typical applications do not automatically distinguish between photographic and non-photographic images when compressing such images.

Consequently, what is needed is a technique for automatically determining an optimal method for reducing the size of an electronic file containing at least one linked or embedded image by automatically determining an optimal compression method for each image in the electronic file. Further, such a technique should provide a capability for output specific compression by tailoring image resolution to particular output devices. In addition, such a technique should be capable of further reducing image size by providing a capability to discard non-essential data such as OLE data streams.

SUMMARY

The present invention involves a new system and process for automatically determining an optimal method for reducing the size of electronic files or documents having at least one embedded or linked image. In general, the basic idea of the present invention is to automatically detect cases where image size causes the file size of the electronic files or documents to become unacceptably large, then to resolve the problem by automatically determining optimal methods for reducing the electronic document to an acceptable size by reducing the size of the images. For example, where electronic files are too large to be emailed, as often occurs where an email server has a preset size constraint for email messages or email attachments, the present invention automatically determines optimal methods for reducing the size of images associated with the email message or email attachment so that it can be emailed.

The present invention automatically determines an optimal method for reducing the size of an electronic file containing at least one embedded image by determining optimal methods for compressing each image. Further, in one embodiment, linked images are also compressed. Additionally, in further embodiments, reducing the size of the electronic document includes user control of relevant parameters such as image compression options, retention or removal of unnecessary data associated with embedded or linked images, downsampling images to better match the output resolution of specific output devices, and reducing the color depth of images to reduce the size of those images.

Optimization of file size is preferably performed in accordance with one or more of three generic embodiments. First, in one embodiment, images are automatically compressed using an automatically determined optimal compression method at the time that each image is embedded in or linked to the electronic document. Second, in another embodiment, all images already embedded in or linked to the electronic document are compressed using automatically determined optimal compression methods for each image following user selection of a compress file option via a user interface. Third, in still another embodiment, all images already embedded in or linked to the electronic document are compressed, again using automatically determined optimal compression methods for each image at the time the user saves the electronic document to a computer readable storage medium. Further, to prevent cumulative degradation of images through repeated lossy compression, images that have already been compressed or optimized are preferably flagged so that they are not compressed more than once.

It should be noted that with respect to linked images, as opposed to embedded images, in a preferred embodiment, linked images are not optimized. This embodiment can be important, because often, linked images are used by more than one application or electronic document, and optimizing such images for one purpose may result in undesired consequences when using a linked image for other purposes. However, in one embodiment, the user is provided with the opportunity to include linked images for optimization via an image source option selected via a user interface.

In accordance with the present invention, the first step in optimizing the size of the electronic file involves automatically determining the characteristics of each image either embedded in, or linked to the electronic document. Next, in one embodiment a desired output destination for the electronic file is determined. In cases where the resolution of an image is greater than that required to produce an acceptable image on a particular output device, the image is then resampled to reduce the resolution to match the output device. An optimal compression method for each image is then automatically determined based on the image characteristics. Finally, a reduction in the size of the electronic file is automatically achieved by applying the optimal compression method to each image. Further reductions of file size are accomplished in alternate embodiments by discarding unnecessary data, such as, for example OLE data associated with specific images, or portions of images that have been cropped.

With respect to determining the characteristics of each image, the present invention automatically determines parameters that define each image, such as, for example, image size, image type (i.e., image encoding scheme—BMP, JPEG, TIFF, GIF, PNG, etc), image color bit depth, whether the image is a photograph, whether the image includes OLE data (i.e. Object Linking and Embedding data), etc. This characteristic data for each image is stored for later use in determining an optimum method for reducing image size, and thus size of the electronic file with which each image is associated. It should be noted that in further embodiments, if in determining the size of each image, an image is found to have a size below a predetermined or user defined threshold, that image is preferably not subjected to any compression unless loss less compression is found to be possible, as the size savings realized by compressing small image files is typically negligible.

Next, in one embodiment, a significant reduction in image size is automatically accomplished by discarding the color information associated with an image. For example, a full color image, even when subjected to JPEG compression, is substantially larger than a grayscale JPEG version of the same image. In a related embodiment, conversion from color to grayscale is performed for each image following user selection of a color-to-grayscale conversion option via a conventional user interface. Further, in one embodiment, color information is automatically discarded where the output device or destination is determined to be a grayscale display or a grayscale printer, such as a typical laser printer.

Next, in one embodiment, the desired output destination for the electronic file is determined. For example, the desired output destination for the electronic file may be a computer monitor, a printer, or other device. This determination is important, because different output devices can provide high quality output results using significantly different image resolutions, and reducing image resolution to better match a given output device serves to provide a simple method for reduction of file size. For example, where an electronic file is to be rendered only to a display device such as a conventional computer monitor, an output resolution of 96 dots per inch (dpi) may be appropriate. Alternately, where an electronic file is to be printed on a high-resolution printer, an output resolution of 300 dpi, 600 dpi, or an even higher resolution may be appropriate. Clearly, any desired resolution appropriate to any specific output device could be used. However, it should be noted that in one embodiment, optimizing electronic file size is accomplished without optimizing image resolution for specific output devices.

Once the output device has been determined, the size of the electronic file is reduced in cases where the resolution of any image is greater than that required to produce an acceptable image on the output device. This reduction in size is accomplished by resampling the image using conventional techniques to reduce image resolution, thereby discarding unnecessary data. For example, where an image is originally 300 dpi, and it is determined that a resolution of 100 dpi is appropriate for the desired output device, the image is downsampled from 300 dpi to 100 dpi, thereby decreasing the size of the image by a factor of approximately nine. Further, while upsampling a low resolution image to match the capabilities of a high-resolution output device is provided in one embodiment, such an embodiment is not preferred because such action will cause the size of the image to increase, thereby increasing the size of the associated electronic file.

Next, an optimal compression method for each image is automatically determined based on the characteristics of each image, and then a reduction in the size of the electronic file is automatically achieved by applying the optimal compression method to each image. It should be noted that in an electronic document having more than one image, different compression methods may be applied to different images depending on the determination of the best method for compressing each image. Specifically, a determination is first made as to whether the image can be subjected to a loss less conversion to a compressed image format, such as, for example, a Portable Network Graphic (PNG) format using a loss less compression algorithm, such as, for example, a Lempel-Ziv (LZ) or Lempel-Ziv-Welch (LZW) compression algorithm. Any loss less compression method that can be successfully applied to an image is automatically applied to the image without notifying the user.

For example, one common method for inserting images into an electronic file is to copy or cut the image from one source or application, then paste that image into the electronic file. However, such methods can result in pasting an image at whatever color bit depth the computer display device is currently operating at, regardless of the actual color depth of the image, or whether a reduced color bit depth would result in an indistinguishable or nearly indistinguishable image. Most modern computers display high-bit color schemes (16, 24 or even 32-bit color schemes) due to the power of conventional graphics accelerators and the capabilities of computer display monitors. Unfortunately, a 24-bit image is three times larger than an 8-bit image. Thus, such copy and paste or cut and paste screen images tend to be substantially larger than necessary. Consequently, in one embodiment, the present invention automatically detects the optimal color depth and performs color depth reduction for the image, thereby reducing the document size in the process.

Further, in one embodiment, if nearly loss less compression is determined to be possible for a given image it is also performed automatically without notifying the user. Specifically, a threshold for nearly loss less compression is predetermined, but in a further embodiment, the user may specify the threshold for loss. For example, assuming a threshold of a 95 percent match, or conversely, a 5 percent loss, for a particular image, if it is determined that compression of the image by palettizing the image using conventional techniques and applying an LZ or LZW compression algorithm will result in a compressed image that represents a 95 percent match to the original image, the nearly loss less compression will be applied automatically. If it is determined that such compression will produce an image having less than a 95 percent match to the original image, the compression will not be applied automatically. Further, in one embodiment, where the threshold is exceeded, the user is automatically notified, and provided with the opportunity to either approve or disapprove such compression.

If loss less compression for a given image is not possible, a determination is made as to whether the image can be compressed using a lossy compression algorithm, such as, for example, a Joint Photographic Experts Group (JPEG) compression algorithm. For example, a JPEG format typically works well for compressing full-color or grayscale photographic images. In one embodiment, such compression is performed automatically, without user notification. However, because such compression is lossy, in a related embodiment, the user is provided with an opportunity to approve lossy compression before it is applied to an image.

Still further reductions of file size are accomplished in alternate embodiments by automatically discarding unnecessary data, such as, for example OLE data associated with specific images. For example, in one embodiment where the OLE data associated with an image indicates that the image is associated with a known application and where it is known that discarding that OLE data will not create potential problems when subsequently attempting to open or edit that image in the associated application, the OLE data is simply automatically discarded. However, in a related embodiment, where the OLE data is not from a known application, or where discarding the OLE data could potentially create problems in subsequently opening or editing the image in the associated application, the user is first notified of the existence and size of the OLE data, and asked to either approve or disapprove deletion of the OLE data.

In related embodiments, further reductions of file size are accomplished by discarding unnecessary data such as portions of images that have been cropped. Similarly, further reductions of file size are accomplished in another embodiment by automatically downsampling an image to match the scaled size where that image has been inserted into the electronic document then rescaled. Such downsampling serves to dramatically reduce file size.

A working example according to the present invention is embodied in a system and process that automatically optimizes the size of electronic files containing at least one embedded or linked image. Linked images are handled as described above, i.e. they are only optimized if they are specifically identified or selected via the user interface.

In this working example, the user is provided an opportunity to decide on or select particular compression options. Further, one embodiment allows the user to select these options for each image individually, while a related embodiment allows the user to select specific options globally for all images. For example, when deciding whether to palettize an image having too many colors for loss less compression, the first embodiment allows the user to select this option individually for every image that is a potential candidate for palettization. In contrast, the second embodiment allows the user to select the option once for all potential candidates for palettization.

Further, as described above, optimization can take place during any or all of the following three instances: first, as images are inserted or linked to the electronic document; second, following user selection of an optimize images option via a user interface; and third at the time the user saves the electronic document to a computer readable storage medium. Consequently, with respect to user input to the image compression/optimization decision process, in one embodiment, the user interface provides an opportunity to make these decisions for each image as it is inserted or linked to the electronic document. Next, in further embodiments, the user interface provides an opportunity make these decisions either individually, or globally, at the time the user either selects the optimize images option via the user interface, or at the time the user saves the electronic document to the computer readable storage medium.

Specifically, images inserted into or linked to an electronic document in a host application, such as, for example a word processor application or a presentation application are first automatically converted into an image format supported by the host application, if necessary. If the decision has been made to discard color data, as discussed above, the image is then converted to a grayscale image. Whether or not color data is discarded from the image, a determination is made as to whether the image is larger than the aforementioned size threshold. If the image is smaller than the threshold, a loss less compression method such as palettization is applied to the image if possible. At this point, the heuristics decision process ends with respect to the image whether or not it is palettized. However, if the image exceeds the threshold size, further automatic analysis and optimization of the image is performed.

In particular, OLE data associated with images exceeding the size threshold that are associated with known applications is automatically discarded as described above in cases where it is known that any associated OLE data can be discarded without causing adverse effects to other applications. However, if the application is not associated with a known application, a determination is made as to whether the image actually has associated OLE data. If the image does have OLE data, a determination is made as to whether that data should be deleted. As described above, in this case, the user is first notified of the existence and size of the OLE data, and asked to either approve or disapprove deletion of the OLE data. However, in one embodiment, a global flag may be set via the user interface such that all OLE data is automatically deleted or retained.

If the OLE data is deleted, a determination as to whether the image is still larger than the size threshold discussed above is again made. If the image is smaller than the threshold, a loss less compression method such as palettization is applied to the image if possible. At this point, the heuristics decision process ends with respect to the image whether or not it is palettized. However, where the image exceeds the threshold size, whether the OLE data was deleted or not, or whether it was determined that the image did not contain OLE data, further automatic analysis and optimization of the image is performed.

Next, continuing with further automatic analysis and optimization, a determination is made as to whether the image is reducible or compressible. Specifically, the type and the bit depth of the image are examined to decide if the image is compressible or not. If the image is a JPEG image for instance, it is considered to be non compressible because further compression would be lossy, on top of the already lossy JPEG compression, and it is likely that image quality would be degraded. However, if, for example, the image is a BMP, PNG, GIF, DIB or TIFF, or similar format, a determination is made as to whether further compression, whether lossy or not, is appropriate for the image. If further compression of the image is not appropriate, the heuristics decision process ends with respect to the image.

If it is determined that further compression is appropriate, a determination is first made as to an estimated number of colors displayed in the image. If the image is found to have less than a threshold number of colors, the image is automatically loss lessly palettized. Similarly, if the number of colors in the image is close to, but exceeds, the threshold, such as, for example a 95 percent match, the image is automatically lossy palettized. In a related embodiment, if the number of colors in the image is close to, but exceeds, the threshold, the user is provided with an opportunity to either approve or disapprove palettization via the user interface, as the palettization in this case will result in a lossy compression because the color palette used provides less colors than are needed to exactly recreate the image. However, if the number of colors in the image clearly exceeds the threshold for palettization, a decision is made as to whether to apply other lossy compression schemes, such as, for example, JPEG compression of the image. Preferably, such compression is applied automatically at this point in the heuristics decision process, at which point the heuristics decision process ends with respect to the image. However, in one embodiment, the user is provided with the opportunity to either approve or disapprove the lossy compression via the user interface, at which point, the compression is either applied or not, in accordance with the user decision, and then the heuristics decision process ends with respect to the image.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
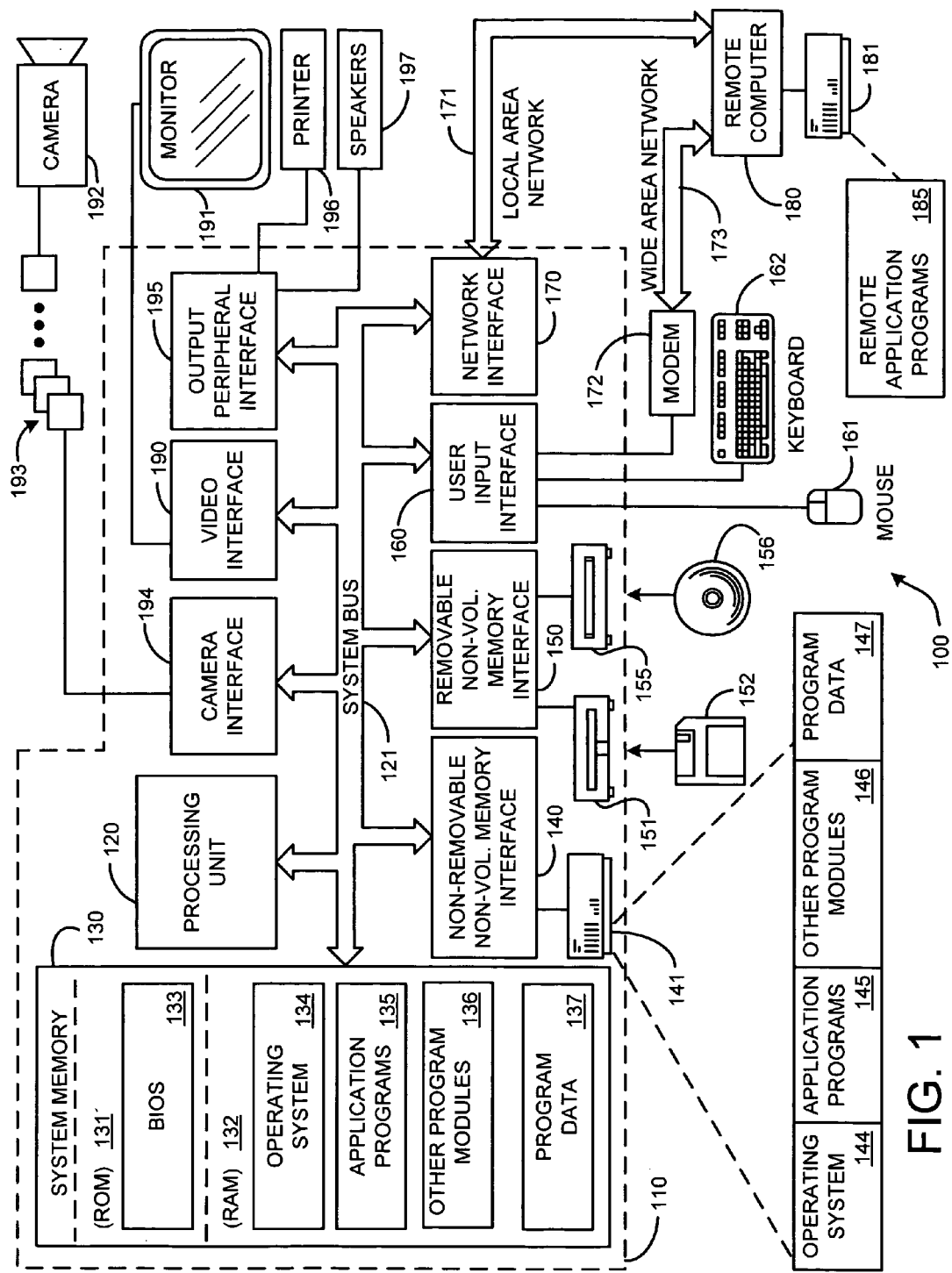
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and process embodying the present invention. The program modules associated with automatically determining an optimal method for reducing the size of an electronic file containing at least embedded image will be described first in reference to the system diagram of FIG. 2. In addition, the processes for automatically determining an optimal method for reducing the size of an electronic file containing at least embedded image will be described with reference to the flow diagram of FIG. 3.

System Overview:

The present invention automatically determines an optimal method for reducing the size of an electronic file containing at least one embedded image by determining optimal methods for compressing each image. Further, in one embodiment, linked images are also compressed. Additionally, in further embodiments, reducing the size of the electronic document includes user control of relevant parameters such as image compression options, retention or removal of unnecessary data associated with embedded or linked images, and downsampling images to better match the output resolution of specific output devices.

Optimization of file size is preferably performed in accordance with one or more of three generic embodiments. First, in one embodiment, images are automatically compressed using an automatically determined optimal compression method at the time that each image is embedded in or linked to the electronic document. Second, in another embodiment, all images already embedded in or linked to the electronic document are compressed using automatically determined optimal compression methods for each image following user selection of a compress file option via a user interface. Third, in still another embodiment, all images already embedded in or linked to the electronic document are compressed, again using automatically determined optimal compression methods for each image at the time the user saves the electronic document to a computer readable storage medium. Further, to prevent cumulative degradation of images through repeated lossy compression, images that have already been compressed or optimized are preferably flagged so that they are not compressed more than once.

It should be noted that with respect to linked images, as opposed to embedded images, in a preferred embodiment, linked images are not optimized. This embodiment can be important, because often, linked images are used by more than one application or electronic document, and optimizing such images for one purpose may result in undesired consequences when using a linked image for other purposes. However, in one embodiment, the user is provided with the opportunity to include linked images for optimization via an image source option selected via a user interface.

Figure 2:
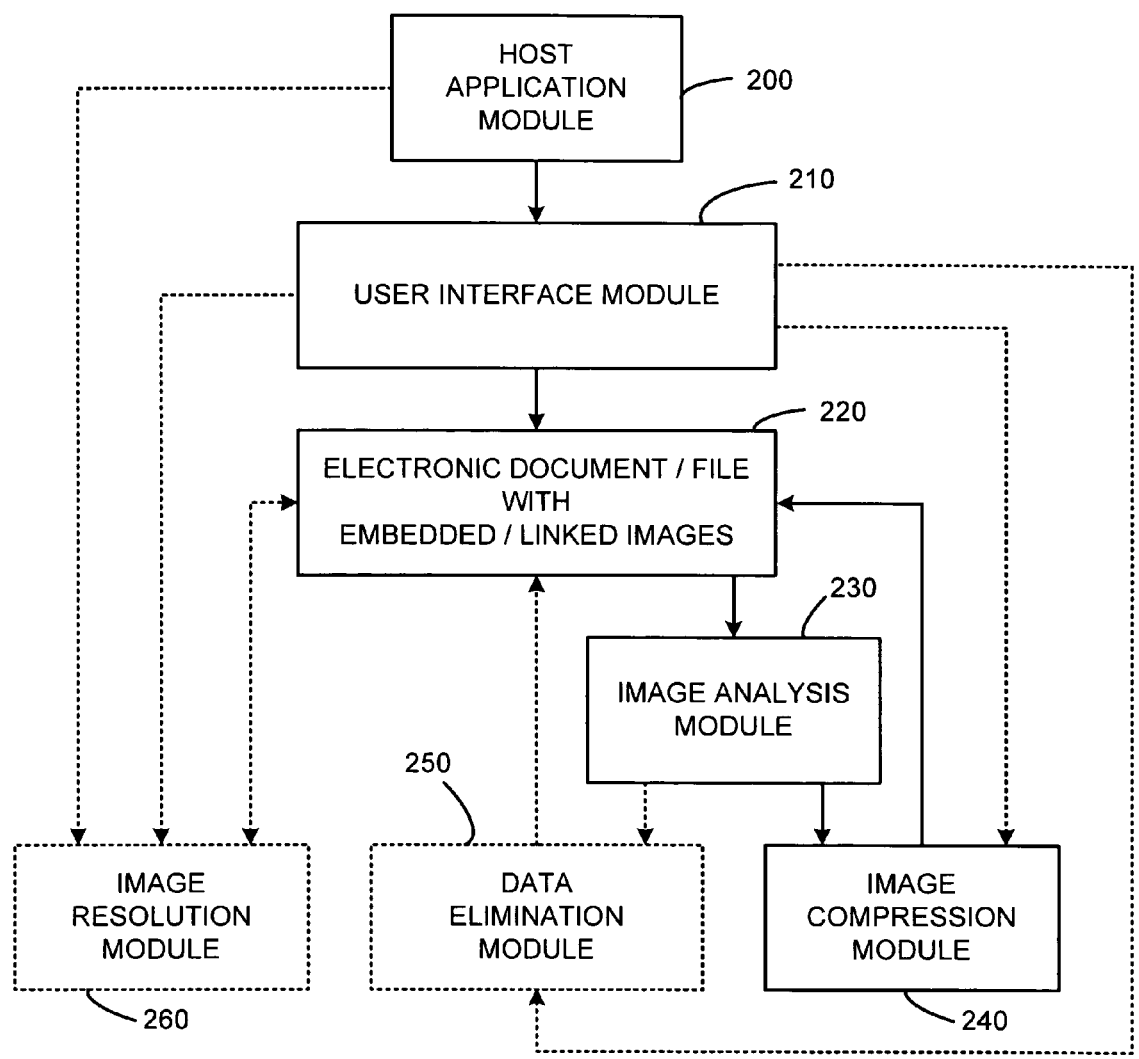
FIG. 2 is a system diagram depicting program modules employed in a system for automatically determining and applying optimal compression methods for images embedded in or linked to an electronic file in accordance with the present invention.

FIG. 2 is a general system diagram illustrating program modules used for determining an optimal method for reducing the size of an electronic file having at least one associated image by determining optimal methods for compressing each image. The size of the electronic file is then reduced by applying the optimal compression method to each image as with each of the three generic cases described above. It should be noted that the boxes and interconnections between boxes that are represented by broken or dashed lines in FIG. 2 represent alternate embodiments of the present invention, and that any or all of these alternate embodiments, as described throughout this document, may be used in combination.

Specifically, as illustrated by FIG. 2, a system and process in accordance with the present invention for determining an optimal method for reducing the size of an electronic file having at least one associated image is preferably included in a host application module 200. The host application module 200 includes an application program such as, for example, a word processing application, an email application, a presentation application, or any other application program for generating or working with electronic files having embedded or linked images. The host application module 200 is user-addressable via a user interface module 210 for interacting with the application program. Further, the host application module 200 is used for creating and or working with at least one electronic document or file 220 having at least one embedded or linked image.

As described herein, images associated with the electronic file 220 are analyzed by an image analysis module 230 to determine the characteristics of each image. Once the characteristics of each image have been determined, an image compression module 240 automatically determines and applies optimal compression methods for each image. Additionally, as described below, where appropriate, in one embodiment the image compression module 240 automatically reduces the color depth or bit depth of images. In a further embodiment, where the image analysis module 230 detects that an image has unnecessary data, such as, for example an OLE data stream, or non-displayed cropped borders of an image, a data elimination module 250 is used to delete the unnecessary data, thereby reducing the size of the image.

Further, in another embodiment, where the dimensions of an image are reduced, such as by scaling the image, an image resolution module 260 automatically resamples the image to reflect the reduced image dimensions. Such resampling typically serves to further reduce the size of the image. In particular, such resampling or "resolution reduction" takes into account the resizing of the image on a page within the electronic document. This embodiment is advantageous in that it is common for a user to scan an image at one resolution, such as 300 dpi, and then scale the image down by some amount to fit the page layout. For example, an image scanned at 300 dpi, then scaled down by 50% to fit the page layout will result in an effective image resolution of 600 dpi. In this example, the same amount of image pixels is being used to paint an image with half of the initial image dimension. Thus, if the user intends to print the page on a printer using a resolution of 300 dpi, then the image has approximately four times too much data. Consequently, the image can safely be downsampled without loss of image print quality.

In a related embodiment, the image resolution module 260 is used for downsampling images. As described below, images are automatically downsampled where an output destination or device resolution warrants downsampling of the image, or where the user directs downsampling of the image via the user interface 210. Also as described below, downsampling of an image typically provides a substantial reduction in image size.

In still another embodiment, the user interface module 210 allows the user to specify particular compression options to be used by the image compression module 240, such as, for example, use of particular lossy compression techniques, or discarding of color information in an image. Further, in another embodiment, the user interface module 210 allows the user to specify types of data to be deleted by the data elimination module 250, such as, for example, OLE data, or non-displayed or cropped portions of an image.

Operation:

The above-described program modules are employed to determine optimal methods for compressing images associated with electronic files using the exemplary process that will now be described. This process is depicted in the flow diagram of FIG. 3 as a series of actions that illustrates an exemplary method for implementing the present invention. It should be noted that the boxes and interconnections between boxes that are represented by broken or dashed lines in FIG. 3 represent alternate embodiments of the present invention, and that any or all of these alternate embodiments, as described throughout this document, may be used in combination.

In general, the system and process of the present invention is started by first automatically determining image characteristics (Box 310) for each image associated with the electronic file. Next, the process continues by automatically determining an optimum compression method for each image (Box 320) based on the characteristics of each image. Finally, the optimal compression method automatically determined for each image is applied to each image (Box 330), either automatically, or following user interaction with the system and process of the present invention via the user interface, as described herein. Further, in an additional embodiment of the present invention, the system and process of the present invention provides a further reduction in image size by discarding image color data (Box 340). Additionally, in one embodiment, the output destination of the electronic document is determined (Box 350), then the resolution of each image is downsampled (Box 360), where appropriate, to match the resolution of the output device. Finally, in another embodiment, unnecessary data, such as, for example OLE data, associated with each image is discarded (Box 370) to provide for a further reduction in image size. Further, in another embodiment, discarding unnecessary data (Box 370) includes automatically discarding non-displayed or cropped portions of an image.

Figure 3:
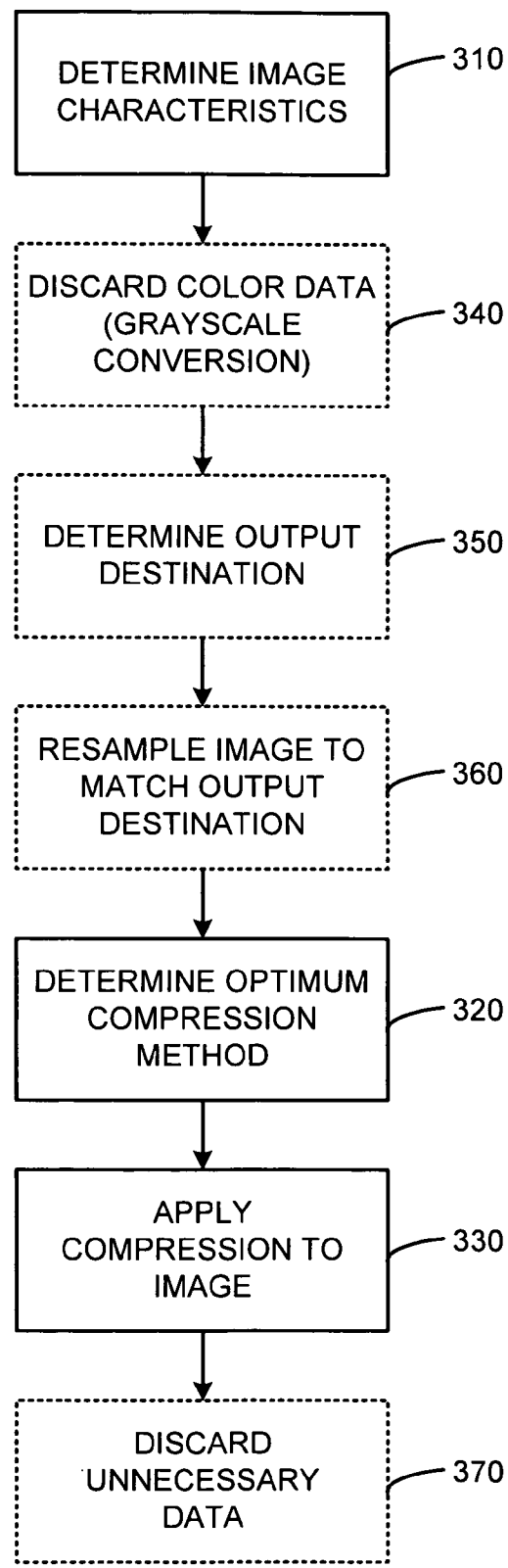
FIG. 3 is a flow diagram illustrating an exemplary process for determining optimal compression methods for images according to the present invention.

Specifically, as illustrated in FIG. 3, the process is started by first automatically determining the characteristics of each image (Box 310) either embedded in, or linked to the electronic document. Next, in one embodiment, a significant reduction in image size is automatically accomplished by discarding the color information (Box 340) associated with an image. For example, a full color image, even when subjected to JPEG compression, is substantially larger than a grayscale JPEG version of the same image. In a related embodiment, conversion from color to grayscale is performed for each image following user selection of a color-to-grayscale conversion option via a conventional user interface (i.e., 210 of FIG. 2). Further, in one embodiment, color information is automatically discarded (Box 340) where the output device or destination is determined to be a grayscale display or a grayscale printer, such as a typical laser printer.

With respect to determining the characteristics of each image (Box 310), the present invention automatically determines parameters that define each image, such as, for example, image size, image type (i.e., image encoding scheme—BMP, JPEG, TIFF, GIF, PNG, etc), image color bit depth, whether the image is a photograph, whether the image includes OLE data (i.e. Object Linking and Embedding data), etc. This characteristic data for each image is stored for later use in determining an optimum method for reducing image size, and thus the size of the electronic file with which each image is associated. It should be noted that in further embodiments, if in determining the size of each image, an image is found to have a size below a predetermined or user defined threshold, that image is preferably not subjected to any compression unless loss less compression is found to be possible, as the size savings realized by compressing small image files is typically negligible.

As mentioned above, in one embodiment a desired output destination for the electronic file is determined (Box 350). In cases where the resolution of an image is greater than that required to produce an acceptable image on a particular output device, the image is then resampled (Box 360) to reduce the resolution to match the output device. An optimal compression method for each image is then automatically determined (Box 320) based on the image characteristics. Finally, a reduction in the size of the electronic file is automatically achieved by applying the optimal compression method (Box 330) to each image. Further reductions of file size are accomplished in alternate embodiments by discarding unnecessary data (Box 370), such as, for example OLE data associated with specific images, or portions of images that have been cropped.

Specifically, in the embodiment described above, the desired output destination for the electronic file is determined (Box 350). For example, the desired output destination for the electronic file may be a computer monitor, a printer, or other device. This determination is important, because different output devices can provide high quality output results using significantly different image resolutions, and reducing image resolution to better match a given output device serves to provide a simple method for reduction of file size. For example, where an electronic file is to be rendered only to a display device such as a conventional computer monitor, an output resolution of 96 dots per inch (dpi) may be appropriate. Alternately, where an electronic file is to be printed on a high-resolution printer, an output resolution of 300 dpi, 600 dpi, or an even higher resolution may be appropriate. Clearly, any desired resolution appropriate to any specific output device could be used. However, it should be noted that in one embodiment, optimizing electronic file size is accomplished without optimizing image resolution for specific output devices.

Once the output device has been determined, the size of the electronic file is reduced in cases where the resolution of any image is greater than that required to produce an acceptable image on the output device. This reduction in size is accomplished by resampling the image (Box 360) using conventional techniques to reduce image resolution, thereby discarding unnecessary data. For example, where an image is originally 300 dpi, and it is determined that a resolution of 100 dpi is appropriate for the desired output device, the image is downsampled from 300 dpi to 100 dpi, thereby decreasing the size of the image by a factor of approximately nine. Further, while upsampling a low resolution image to match the capabilities of a high-resolution output device is provided in one embodiment, such an embodiment is not preferred because such action will cause the size of the image to increase, thereby increasing the size of the associated electronic file. In separate embodiments, downsampling of images is performed either automatically, or following user selection of a downsample images option via the user interface.

Next, an optimal compression method for each image is automatically determined (Box 320) based on the characteristics of each image, and then a reduction in the size of the electronic file is automatically achieved by applying the optimal compression method to each image (Box 330). It should be noted that in an electronic document having more than one image, different compression methods are applied to different images depending on the determination of the best method for compressing each image. Specifically, a determination is first made as to whether the image can be subjected to a loss less conversion to a compressed image format, such as, for example, a Portable Network Graphic (PNG) format using a loss less compression algorithm, such as, for example, a Lempel-Ziv (LZ) or Lempel-Ziv-Welch (LZW) compression algorithm. Any loss less compression method that can be successfully applied to an image is automatically applied to the image without notifying the user.

For example, a determination of an optimal compression method for an image (Box 320) may include a determination that the color depth of the image can be reduced. In particular, one common method for inserting images into an electronic file is to copy or cut the image from one source or application, then to paste that image into the electronic file. However, such methods can result in pasting an image at whatever color bit depth the computer display device is currently operating at, regardless of the actual color depth of the image. This is true even where a reduced color bit depth would result in an indistinguishable or nearly indistinguishable image. Most modern computers display high-bit color schemes (16, 24 or even 32-bit color schemes) due to the power of conventional graphics accelerators and the capabilities of computer display monitors. Unfortunately, a 24-bit image is approximately three times larger than an 8-bit image. Thus, such copy and paste or cut and paste screen images tend to be substantially larger than necessary.

Consequently, in one embodiment, the present invention automatically detects the optimal color depth for the image and performs color depth reduction for the image, thereby reducing the document size in the process. This reduction in color depth does not preclude further compression of the image as described above. In fact, while a reduction in the color depth of an image can be performed at any time, in a preferred embodiment, the reduction in color depth is performed prior to other compression techniques, as this may result in further image size reductions such as by allowing for palettization of the image.

Further, in one embodiment, if nearly loss less compression is determined to be possible for a given image it is also performed automatically without notifying the user. Specifically, a threshold for nearly loss less compression is predetermined, but in a further embodiment, the user may specify the threshold for loss. For example, assuming a threshold of a 95 percent match, or conversely, a 5 percent loss, for a particular image, if it is determined that compression of the image by palettizing the image using conventional techniques and applying an LZ or LZW compression algorithm will result in a compressed image that represents a 95 percent match to the original image, the nearly loss less compression is applied automatically. Conversely, if it is determined that such compression will produce an image having less than a 95 percent match to the original image, the compression will not be applied automatically. Further, in one embodiment, where the threshold is exceeded, the user is automatically notified, and provided with the opportunity to either approve or disapprove such compression via the user interface. In a related embodiment, a preview of the effect of the lossy compression on the image is provided to the user prior to user approval of the lossy compression.

If loss less compression for a given image is not possible, a determination is made as to whether the image can be compressed using a lossy compression algorithm, such as, for example, a Joint Photographic Experts Group (JPEG) compression algorithm. For example, a JPEG format typically works well for compressing full-color or grayscale photographic images. In one embodiment, such compression is performed automatically, without user notification. However, because such compression is lossy, in a related embodiment, the user is provided with an opportunity to approve lossy compression via the user interface before it is applied to an image.

Still further reductions of file size are accomplished in alternate embodiments by automatically discarding unnecessary data (Box 370), such as, for example OLE data associated with specific images. For example, in one embodiment where the OLE data associated with an image indicates that the image is associated with a known application and where it is known that discarding that OLE data will not create potential problems when subsequently attempting to open or edit that image in the associated application, the OLE data is simply automatically discarded. However, in a related embodiment, where the OLE data is not associated with a known application, or where discarding the OLE data could potentially create problems in subsequently opening or editing the image in the associated application, the user is first notified of the existence and size of the OLE data, and asked to either approve or disapprove deletion of the OLE data via the user interface.

In related embodiments, further reductions of file size are accomplished by discarding unnecessary data such as non-displayed or cropped portions of an image. Similarly, further reductions of file size are accomplished in another embodiment by automatically downsampling an image to match the scaled size where that image has been inserted into the electronic document then rescaled. Such downsampling typically serves to substantially reduce file size. Further, in a related embodiment, when the image is resampled, it is automatically converted from an NTSC color encoding format to an sRGB format while at the same time, information content such as OLE data, and other non-image data not necessary for rendering the image is automatically removed from the image.

WORKING EXAMPLE

Figure 4:
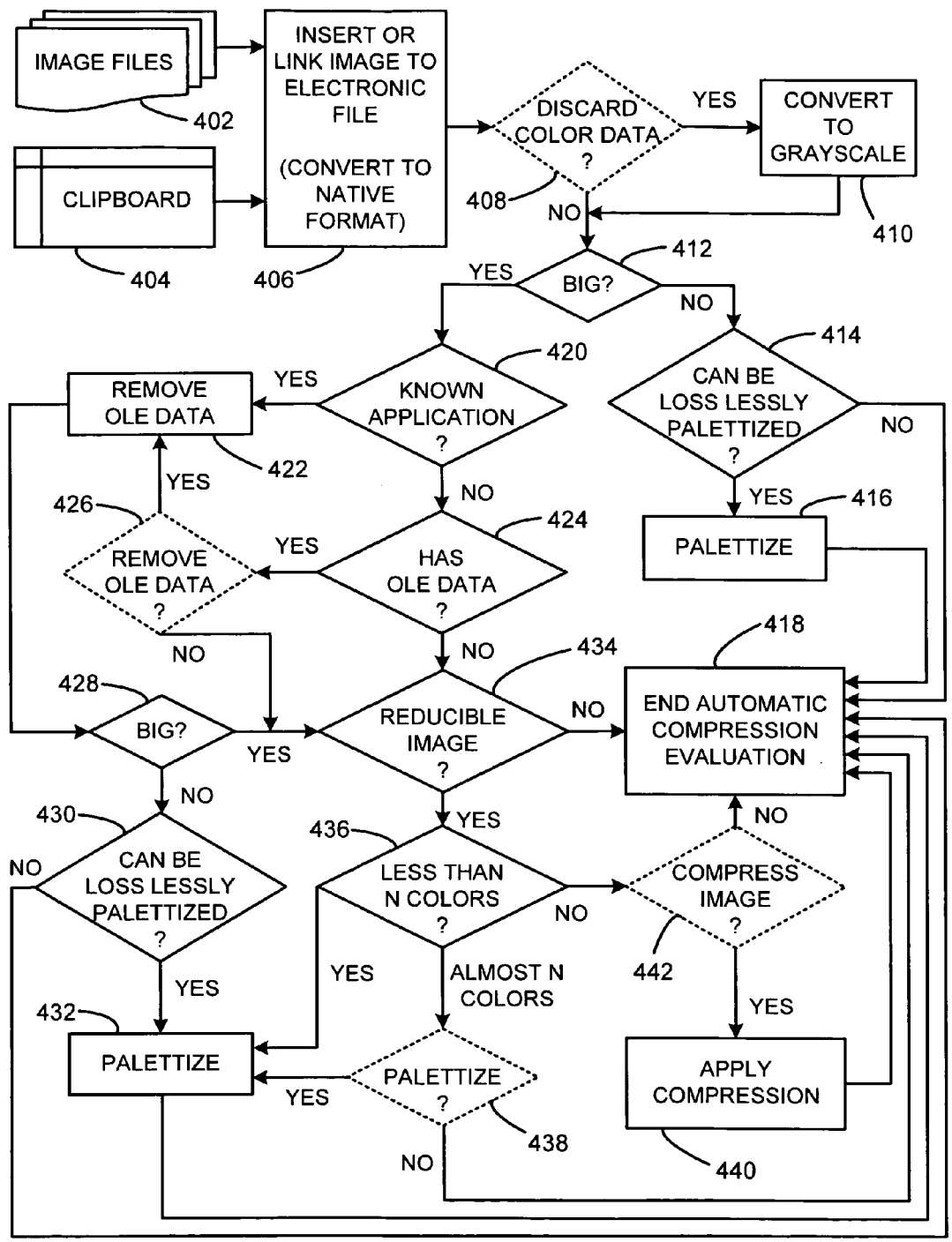
FIG. 4 is a flow diagram illustrating an exemplary working example for automatically determining and applying optimal compression methods for images embedded in or linked to an electronic file in accordance with the present invention.

As illustrated by the exemplary heuristics decision process of FIG. 4, a working example according to the present invention is embodied in a system and process that automatically optimizes the size of electronic files containing at least one embedded or linked image. Linked images are handled as described above, i.e. they are only optimized if they are specifically identified or selected via the user interface. It should be noted that this working example only describes discarding of image color data, image compression and discarding of OLE data. However, in addition to the automatic compression evaluation described below and illustrated in FIG. 4, additional embodiments of this working example include other image size reduction techniques as described above. For example, such image size reduction techniques include discarding non-displayed or cropped portions of images, downsampling images to match a particular output device, and resampling scaled images.

In this working example, the user is provided an opportunity to decide on particular compression decisions, as described below. Further, one embodiment allows the user to make these decisions for each image individually, while a related embodiment allows the user to make specific decisions globally for all images. For example, when deciding whether to palettize an image having too many colors for loss less compression, the first embodiment allows the user to make this decision individually for every image that is a potential candidate for such palettization. In contrast, the second embodiment allows the user to make the decision once for all potential candidates for palettization. Further, as described above, optimization can take place during any or all of the following three instances: first, as images are inserted or linked to the electronic document; second, following user selection of an optimize images option via the user interface; and third at the time the user saves the electronic document to a computer readable storage medium using conventional techniques.

Consequently, with respect to user input to the image compression/optimization decision process, in one embodiment, the user interface provides an opportunity to make these decisions for each image as it is inserted or linked to the electronic document. Next, in further embodiments, the user interface provides an opportunity to make these decisions either individually, or globally, at the time the user either selects the optimize images option via the user interface, or at the time the user saves the electronic document to the computer readable storage medium.

As illustrated by FIG. 4, images from files 402 or a "clipboard" 404 inserted into or linked to an electronic document 406 in a host application, such as, for example a word processor application or a presentation application are first automatically converted into an image format supported by the host application (i.e. a "native format"), if necessary. Further, this conversion to a native format 406 includes loss less compression where possible (i.e. RLE, LZ, or LZW compression). If the decision has been made to discard color data 408, i.e. either via user selection or as a result of using a grayscale output device, as discussed above, the image is then converted to a grayscale image 410. Whether or not color data is discarded from the image, a determination is made as to whether the image is larger than the aforementioned size threshold, i.e. whether it is too big 412.

Specifically, after deciding whether to discard color data 408, a determination of the image size is made to determine whether the image is too big 412. In most cases, nothing is done to an image if it's already small enough. The determination of whether an image is too big is important for several reasons. First, small images do not tend to cause problems with overall file size. Further, any attempt to reduce the quantity of information of a small image by compressing that image can potentially result in a quality loss serious enough to make the image unusable.

The image size that is considered here is the size of the image information in its native format, including OLE data; in other words, a determination is made as to the contribution of the whole image object to the size of the electronic document. The determination as to whether an image is too big takes into account the type and compression efficiency for each image type, the total size of the image, including OLE data, and the pixel dimensions (i.e. pixel size) and bit depth of the image. While any image type can be considered for compression efficiency, typical types include, for example, BMP, DIB, JPEG, PNG, GIF, TIFF, and metadata type images. The image type, file size, pixel size and bit depth are automatically compared to type dependant threshold and compression efficiency values stored in a computer readable medium. These threshold values are preferably predefined. However, in one embodiment, these threshold values are user definable.

Next, an "uncompressed file size" is determined by multiplying the number of pixels in the image by the bit-depth of the each pixel. This uncompressed file size is then divided by the actual file size of the image to compute an image compression efficiency value. This image compression efficiency value is then compared to a threshold efficiency value for the particular image type. As discussed above, images below a certain threshold size are not compressed. Thus, if the file size of the image is larger than a predefined maximum size, such as, for example 200 KByte, and the image compression efficiency value is less than the threshold efficiency for the particular image type, then the image is considered big, and will be subjected to further processing for determining an optimal compression method for that image.

If the image is not considered big, then a loss less compression method such as palettization is applied to the image if possible 414 and 416. At this point, the automatic compression evaluation heuristic decision process ends 418 with respect to the image whether or not it is palettized or otherwise loss lessly compressed.

If the image is found to be too big 412, as described above, OLE data from a known application 420 associated with the image is automatically discarded 422 as described above in cases where it is known that any associated OLE data can be discarded without causing adverse effects to other applications. However, if the application is not associated with a known application, a determination is made as to whether the image actually has associated OLE data 424.

If the image does have OLE data, a determination is made as to whether that data should be deleted 426. As described above, in this case, the user is first notified of the existence and size of the OLE data, and asked to either approve or disapprove deletion of the OLE data. However, in one embodiment, where the actual size of the OLE data in comparison to the size of the image information in the image is smaller than a predetermined threshold for OLE data size, then a decision is automatically made to not remove OLE data 424 and the user is not notified. Conversely, in one embodiment, where the actual size of the OLE data in comparison to the size of the image information in the image is larger than a predetermined threshold for OLE data size, then a decision is automatically made to remove OLE data 424 without notifying the user. In a related embodiment, the user is provided with the capability to modify the OLE data threshold sizes via the user interface. Further, in one embodiment, a global flag may be set via the user interface such that all OLE data is either automatically deleted or retained without further notifying the user.

If the OLE data is deleted or removed 422, a determination as to whether the image is still too large or too big 428 is again made as described above, with the exception that in this case, the image size is considered without OLE data. If the image is not too big, a loss less compression method such as palettization is applied to the image if possible 430 and 432. At this point, the automatic compression evaluation heuristic decision process ends 418 with respect to the image whether or not it is palettized or otherwise loss lessly compressed. However, where the image is found to be too large 428, further automatic analysis and optimization of the image is performed as described below.

In general, if the image is either found to be too big 428, or it does not have associated OLE data 424, a determination is then made as to whether the image is reducible or compressible 434. In making this determination, the type and the bit depth of the image are examined to decide whether the image is compressible. For example, if the image were already a JPEG image, it would considered to be non-compressible because further compression would be lossy, on top of the already lossy JPEG compression, and it is likely that image quality would be degraded. However, if, for example, the image is a BMP, PNG, GIF, DIB, TIFF, or other format, a determination is made as to whether further compression, whether lossy or not, is appropriate for the image. If compression of the image is not appropriate, the automatic compression evaluation heuristic decision process ends 418 with respect to the image.

TABLE 1 provides one example used in a tested embodiment of the present invention for determining whether compression should be applied to a particular image based on its type and bit-depth. It should be appreciated by those skilled in the art that other file types and compression methods may be applied, and that TABLE 1 is intended for purposes of explanation only.

TABLE 1

| Type | Mode | Bit Depth | Compression | Reducible? |
|---|---|---|---|---|
| EMF/WMF/EMF+ | — | — | Vector representation | No |
| JPEG | RGB | 24/8 | ADCT | No |
| BMP/DIB | RGB | 24 | None | Yes |
| BMP/DIB | Grayscale | 8 | RLE/None | Yes |
| BMP/DIB | Indexed | 8-4-1 | RLE/None | No |
| PNG | A/RGB | 8/24 | LZ/None | No |
| PNG | RGB | 24 | LZ/None | Yes |
| PNG | A/Grayscale | 8/8 | LZ/None | No |
| PNG | Grayscale | 8-4-2-1 | LZ/None | Yes |
| PNG | Indexed | 8-4-2-1 | LZ/None | No |
| GIF | A/Indexed | 1 color/8 | LZW/None | No |
| GIF | Indexed | 8 | LZW/None | No |

It should be noted that in this table, when transparency is present in the image (i.e. the image has an Alpha channel), the "Mode" is prefixed "A/", which stands for "Alpha/". In this case, the "Bit Depth" gives both transparency and color depth, respectively. Further, as evidenced by the "Compression" column this table assumes that loss less conversion to a native format (406 as described above) and optimization is already done where possible. In addition, the "Bit Depth" column of Table 1 lists all supported bit-depths for indexed colors separated by a "-". In this working example, indexed images are not treated differently depending on their bit depth.

Another way to look at Table 1 is by stating a set of exemplary rules derived from the table as follows: 1) If the image is a metafile, i.e. WMF or EMF, then it is considered not to be reducible as rendering the vector format of a metafile typically results in a loss of image quality; 2) If the image is a JPEG image, then it is considered not to be reducible, because attempting to further compress an already JPEG compressed image typically does not result in a further reduction in size, but may result in a further loss of quality; 3) If the image is an indexed color image, such as a palettized image, it is generally considered not to be reducible, however, in one embodiment, where a smaller palette than that already used for the image can be losslessly, or nearly losslessly applied to the image the image size is further reduced by applying the smaller palette to the image; 4) If the image has an alpha channel or transparency, then it is considered not to be reducible or compressible as it is difficult to compress or reduce transparency in an image without significant loss of image quality; 5) All images not falling under one of the previous rules is considered to be reducible or compressible. If the image is determined not to be compressible, the automatic compression evaluation heuristic decision process ends 418 with respect to the image.

Once the determination is made that the image is compressible 434 in accordance with the aforementioned rules, one of two compression methods is applied, i.e., palettization 432, or JPEG compression 440 as described below. Clearly while this working example uses only these two compression methods at this point, in other embodiments, any conventional compression method, having any desired amount of loss, may be used. Specifically, the number of colors 436 in the image is first estimated, using any conventional method for estimating the number of colors, such as, for example the hash table procedure described below, to determine whether palettization 432 should be applied instead of JPEG compression 440. The reason for this analysis is that palettization typically results in greater a compression ratio than does JPEG compression. Further, in one embodiment, where the image is already palletized, the test applied at 436 of FIG. 4 is expanded to include a determination of whether a smaller palette could be used to provide further loss less or nearly loss less repaletteization of the image.

In general, with respect to palettization, if the image is found to have less than a threshold number of colors, the image is automatically palettized. In a tested embodiment, a palette threshold size of 256 colors was used. Similarly, if the number of colors in the image is close to, but exceeds, the threshold, such as, for example a 95 percent match (i.e. 269 colors), the image is automatically palettized 432. In a related embodiment, if the number of colors in the image is close to, but exceeds, the threshold, i.e. a 90 percent match, the user is provided with an opportunity to either approve or disapprove palettization 438 via the user interface, as the palettization 432 in this case will result in a lossy compression because the color palette used provides less colors than are needed to exactly recreate the image. In a related embodiment, the user is automatically provided with a preview of the result of palettization of the image prior to approving such palettization. In each of these palettization embodiments, once the image is palettized, or when the decision is not to palettize the image, the automatic compression evaluation heuristic decision process ends 418 with respect to the image.

In contrast, where the number of colors in the image exceeds the threshold for palettization, JPEG compression 440 is automatically applied to the image. However, in one embodiment, the user is provided with the opportunity to either approve or disapprove 442 the lossy JPEG compression via the user interface, at which point, the compression 440 is either applied or not, in accordance with the user decision. At this point, the automatic compression evaluation heuristic decision process ends 418 with respect to the image.

Specifically, with respect to palettization, in determining whether palettization is appropriate, two cases are considered in this working example. The first case applies where the image is a color image such as an RGB bitmap image. The second case applies where the image is a grayscale bitmap image. It should be noted that while the working example described below uses a palettization level of 256 colors or shades of gray, clearly any other desired level of image palettization may be applied.

In counting or estimating the number colors in the image, each pixel in the image is scanned or examined, and any of a number of conventional techniques is used for counting or estimating the number of colors in the image. One such technique involves the use of a hash table to keep track of the encountered colors and to count the number of occurrences of each color. Note that since the objective here is to count a maximum of 256 colors to build a palettized image, the hash table can be rather small. For example, in a tested embodiment, a color rejection threshold of 5% and an efficiency filling of 30% was used, thereby allowing a hash table of around two thousand entries. Further, because a lossy palette reduction is applied where there are almost 256 colors, the number of pixels per color is also maintained using a 3D histogram for selecting the most common colors.

If too many colors are present in the image, then the image is considered to not be palettizable, and instead considered to be suitable for JPEG compression. However, if the number of colors is less than or equal to 256, the image can be loss lessly palettized. Thus, in this case, the image is palletized using an optimum color palette created from the hash table, or other conventional technique used for counting or estimating colors in the image. Alternately, where there are more than 256 colors, the first 256 colors with the highest occurrence are counted. If this cumulative count is more than 95 percent of the total amount of pixels, (i.e. a 95 percent match) then the image is a candidate for nearly loss less palettization as described below. Where such lossy palettization is used, a 256-color palette is extracted from the counted estimated colors in the image. However, it should be noted that this palette is not necessarily built with the highest occurrence color elements. For example, when using a hash table, the elements bounding the portion of the color space addressed by the table are used to create the palette rather than simply using the highest occurrence color elements.

In the case of grayscale images, the analysis is simpler than for color images. In particular, for grayscale images of 8 bits or less, such images necessarily have less than 256 colors. Thus, in palettizing such images, the bit depth is further reduced, if possible. Towards this end, the number n of non-empty cells on a histogram of the image is counted. If this number is smaller than $2^{b-1}$, where b represents the original bit depth of the grayscale bitmap image, and the gray values cannot be reduced to the (b−1) bits range, then a loss less conversion to an indexed bitmap is automatically performed using an optimal bit depth equal to the result of rounding $\log_2(n)$ up to the next highest integer value. Further, trying to palettize a grayscale image that can not be reduced in bit depth will not gain any significant amount of space, so in such a case, it is considered to not be either palettizable or a good candidate for JPEG compression.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically determining an optimal method for reducing the size of an electronic file having at least one image, comprising using a computing device to perform the following steps:
   automatically determining characteristics of each image;
   determining resolution characteristics of an output destination of the electronic file;
   automatically setting a resolution of each image based on the output destination of the electronic file; and
   automatically determining an optimal compression method for each image based on the image characteristics.

2. The method of claim 1 further comprising steps for applying the optimal compression method to each image for reducing the size of the electronic file.

3. The method of claim 2 further comprising steps for applying the optimal compression method to each image as each image is embedded in the electronic file.

4. The method of claim 2 further comprising steps for applying the optimal compression method to each image as the electronic file is saved.

5. The method of claim 2 further comprising steps for applying the optimal compression method to each image in response to a request to optimize the images made via a user interface.

6. The method of claim 1 further comprising steps for automatically discarding OLE data associated with each image.

7. The method of claim 1 further comprising steps for automatically discarding cropped portions of each image in the electronic file.

8. The method of claim 1 further comprising steps for automatically discarding color information for each image in the electronic file where the output device is a grayscale output device.

9. A system for automatically reducing the size of an electronic file having at least one associated image, comprising using a computing device for:
- determining characteristics of each associated image;
- discarding unnecessary data associated with each associated image;
- determining an optimal compression method for each associated image based on the characteristics of each associated image; and
- applying the optimal compression method to each associated image.

10. The system of claim 9 further comprising determining an intended output device for the electronic file and automatically downsampling each associated image to match a resolution of the intended output device.

11. The system of claim 9 wherein the unnecessary data is any of:
- OLE data coupled to each associated image;
- non-displayed cropped portions of each associated image;
- color information for each associated image; and
- any data not necessary for rendering the image.

12. The computer-implemented process of claim 9 wherein a color bit depth of any associated image is automatically reduced when it is determined that a lower image bit depth will result in a visually identical image.

13. A computer-implemented process for automatically reducing the size of an electronic file having at least one embedded image, comprising steps for:
- determining characteristics of each embedded image;
- determining an output destination of the electronic file;
- automatically setting a resolution of each image based on the output destination of the electronic file;
- discarding unnecessary data associated with each embedded image;
- determining an optimal compression method for each associated image based on the characteristics of each embedded image; and
- applying the optimal compression method to each embedded image for reducing the size of the electronic file.

14. The computer-implemented process of claim 13 wherein the electronic file has at least one linked image, and further comprising steps for treating each linked image in the same manner as each embedded image.

15. The computer-implemented process of claim 13 wherein the unnecessary data includes any of:
- OLE data coupled to each embedded image, and wherein the OLE data is associated with at least one predefined application program;
- non-displayed cropped portions of each embedded image;
- color information for each embedded image; and
- any other data not necessary for rendering the image.

16. The computer-implemented process of claim 13 further comprising steps for automatically resampling any embedded image that has been reduced in size relative to an original size for that image.

17. The computer-implemented process of claim 13 further comprising steps for instantiating a user interface for interacting with the computer-implemented process.

18. The computer-implemented process of claim 13 wherein the optimal compression method includes any of lossless and lossy compression methods, and further comprising steps for automatically applying the lossless compression method to each embedded image for which the optimal compression method is the lossless compression method.

19. The computer-implemented process of claim 18 further comprising steps for automatically applying the lossy compression method to each associated image for which the optimal compression method is the lossy compression method.

20. The computer-implemented process of claim 18 further comprising steps for automatically applying the lossy compression method to each image for which the optimal compression method is the lossy compression method when a calculated amount of loss is below a predetermined loss threshold.

* * * * *